US008037163B1

(12) United States Patent
Lo et al.

(10) Patent No.: US 8,037,163 B1
(45) Date of Patent: Oct. 11, 2011

(54) ALTERNATIVE METHODOLOGY IN ASSESSING NETWORK AVAILABILITY

(75) Inventors: Wing F. Lo, Plano, TX (US); Richard C. McNamara, Thornton, CO (US); Bahareh Momken, Boulder, CO (US); Bruce Robinson, Erie, CO (US)

(73) Assignee: Avaya Inc., Basking Ridge, NJ (US)

( * ) Notice: Subject to any disclaimer, the term of this patent is extended or adjusted under 35 U.S.C. 154(b) by 407 days.

(21) Appl. No.: 11/971,098

(22) Filed: Jan. 8, 2008

(51) Int. Cl.
*G06F 15/16* (2006.01)
(52) U.S. Cl. ........................................ 709/223; 370/254
(58) Field of Classification Search .................. 709/236
See application file for complete search history.

(56) References Cited

U.S. PATENT DOCUMENTS

| | | | |
|---|---|---|---|
| 4,009,343 A | 2/1977 | Markey et al. | |
| 6,075,848 A | 6/2000 | Lunn et al. | |
| 6,430,160 B1 * | 8/2002 | Smith et al. | 709/224 |
| 6,775,824 B1 | 8/2004 | Osborne et al. | |
| 6,826,716 B2 | 11/2004 | Mason | |
| 6,895,578 B1 | 5/2005 | Kolawa et al. | |
| 6,912,221 B1 * | 6/2005 | Zadikian et al. | 709/226 |
| 6,934,934 B1 | 8/2005 | Osborne et al. | |
| 6,944,848 B2 | 9/2005 | Hartman et al. | |
| 6,948,153 B2 | 9/2005 | Bowers | |
| 6,966,048 B2 | 11/2005 | Bowers | |
| 6,968,363 B1 | 11/2005 | Mulvey | |
| 7,000,224 B1 | 2/2006 | Osborne et al. | |
| 7,054,308 B1 | 5/2006 | Conway | |
| 7,124,401 B2 | 10/2006 | Muller et al. | |
| 7,127,641 B1 | 10/2006 | Anderson | |
| 7,149,226 B2 | 12/2006 | Wolrich et al. | |
| 7,239,166 B2 | 7/2007 | Braverman et al. | |
| 2004/0160983 A1 | 8/2004 | Kuskin et al. | |
| 2006/0146820 A1 | 7/2006 | Friedman et al. | |

OTHER PUBLICATIONS

"Welcome to Superx++ Source!," available at http://xolusplus.sourceforge.net/indexPage.html (Nov. 4, 2002).
Gregory V. Wilson, "XML-Based Programming Systems," Doctor Dobb's Journal, pp. 16-24, Mar. 2003.
"Download XppEngCOM.dll," available at http://xplusplus.sourceforge.net/Downloads/XppEngCOM.html (2002).
"Download XppEngFilt.dll," available at http://xplusplus.sourceforge.net/Downloads/XppEngFilt.html (2002).
"Download XppConsole.exe," available at http://xplusplus.sourceforge.net/Downloads/XppConsole.html (2002).
"Download XppHub.exe," available at http://xplusplus.sourceforge.net/Downloads/XppHub.html (2002).
"Download XppExt.dll," available at http://xplusplus.sourceforge.net/Downloads/XppExt.html (2002).
"Download XppTester.exe," available at http://xplusplus.sourceforge.net/Downloads/XppTester.html (2002).
U.S. Appl. No. 11/087,200, Momken et al.
U.S. Appl. No. 10/944,069, Lo et al.

* cited by examiner

*Primary Examiner* — Bunjob Jaroenchonwanit
(74) *Attorney, Agent, or Firm* — Sheridan Ross P.C.

(57) ABSTRACT

The present invention provides methods, devices, and systems for determining the availability of at least a part of a communications network in the context of alternate routing. Moreover, the present invention is adapted to consider network flow variations based on device outages all while accounting for the actual probability associated with various re-routing scenarios.

22 Claims, 9 Drawing Sheets

ALTERNATIVE METHODOLOGY IN ASSESSING NETWORK AVAILABILITY

FIELD OF THE INVENTION

The invention relates generally to communication networks and more specifically to the analysis of communication network availability.

BACKGROUND

As enterprises accelerate their migration from traditional circuit switched telephony services to Internet Protocol (IP) Telephony solutions, a major consideration is their ongoing concern as to the potential reliability of the proposed IP voice services versus that of their current infrastructure. Indeed, in many call center environments, the potential cost of downtime is often greater than the implied benefits of migrating to IP Telephony. As such, it is often crucial for an enterprise system to meet a certain level of availability (e.g., 99.99% available) for the entire enterprise system or for at least one or more site(s) or subsystem(s) of the system.

The availability of a switching system is traditionally defined as the probability that the system is operational (i.e., percentage of uptime). The availability is generally calculated from an end-user's perspective and does not necessarily reflect the frequency of individual component failures or required maintenance where they do not affect the availability of the overall system to an end-user. The telecommunications industry requires a high degree of rigor, structure and methodologies for determining whether a device or service is operational. The switching system, including both hardware and software, and the supporting data network transport layer can be designed with back-up servers and alternate traffic routes in order to assure high level of availability.

The Alternative Methodology in Assessing Network Availability discussed here will assess the transport layer network availability when designed with back-up servers and alternate traffic routes. A by-product of this methodology is providing the ability to determine the degree of improvement in system availability, in quantitative terms, obtained through the use of back-up servers and/or alternative traffic routing. Moreover, the methodology must be applicable to configurations in which the various traffic route failure rates are arbitrary (i.e., not necessarily all equal.)

There are currently two methodologies for obtaining these calculations. The first methodology involves using purely mathematical models. More particularly, one common approach is by means of the combinetorics method, which entails solving for the coefficients of Network Reliability Polynomials. This combinetorics method involves the evaluation of network availability by accounting for all possible routes, including the alternative routes, between the nodes (e.g., remote locations) in a network configuration. However, solving for the network availability using the combinetorics method becomes exponentially complex as the number of nodes in the network increases. When a network comprises more than about six nodes (e.g., remote locations in the network configuration), the corresponding combinatorial mathematics become intractable, thus making it almost impossible to find a closed-form solution for the network availability. Rather than being able to solve for the actual network availability in such complex networks, the combinetorics method is only able to provide upper and lower bounds between which the network availability is guaranteed to fall. The combinetorics method can, therefore, only offer an estimation of the overall network availability. Moreover, to solve for the coefficients of Network Reliability Polynomials, most existing combinatorial approaches rely upon the simplifying assumption that all links between the nodes have equal failure rates. However, such an assumption is quite unrealistic for actual configurations in the field, thus resulting in misleading estimations of network availability.

The second methodology is described in U.S. patent application Ser. No. 11/087,200, entitled "Traffic Based Availability Analysis", the entire contents of which are hereby incorporated herein by this reference in its entirety. The methodology described in that patent application utilizes non-stochastic simulation ("bulk traffic flow"). The methodology described therein eliminates the necessity to assume that all links between the network nodes have equal failure rates. The methodology of that application, however, does not include a way to account for backup servers and/or alternate traffic routing.

It would therefore be desirable to have a methodology which will provide accurate network availability values (as opposed to lower bounds and upper bounds) while accounting for back up servers and/or alternative traffic routing in the system design. Moreover, it will also apply to networks with arbitrary component failure rates (i.e., without relying on the assumption that all links have the same failure rate).

SUMMARY

These and other needs are addressed by various embodiments and configurations of the present invention. The present invention is directed generally to a system, device, and method for analyzing an availability of part or all of a communications network. The method generally comprises:

identifying at least a first and second scenario for the network, wherein the first scenario comprises the set of network components arranged in a first communication configuration and wherein the second scenario comprises the set of network components arranged in a second communication configuration;

determining an availability of the network in the first scenario;

determining an availability of the network in the second scenario;

determining an overall network availability based on the availability of the network in the first and second scenario; and an availability assessment tool providing an indication of the overall network availability.

The configurations of the network in the different scenarios may vary based on a number of different considerations. One way that the configurations may differ is that at least one component in the network may be operational in the first scenario and non-operational in the second scenario. Another way the configurations may differ is in the communication paths that are used to carry communication traffic (e.g., signaling and media traffic).

In accordance with one or more embodiments of the present invention, the availability associated with each scenario (i.e., each scenario availability) is determined by simulating communication traffic through the network under each scenario. The scenario availabilities will likely differ from one scenario to another because different traffic routes are traversed and there is often one component active in one scenario and failed in another. This causes other components in the network to have their usages changed, which affects the availability of the network in the new scenario.

Each scenario availability may be combined with a scenario probability (i.e., the probability that a particular scenario will occur) to determine a scenario availability probability. The availability probabilities of each scenario possible under a particular network configuration can then be combined to determine the overall network availability. This overall network availability is an accurate reflection of the availability of the network under a number of different scenarios, the probabilities of which have been taken into account.

By accounting for the possibility that a backup server or other type of backup component may be required to become active in the event that the primary server or component fails, an availability calculation can be made with much greater accuracy than before. Similarly, by accounting for alternate traffic routes, a more accurate availability calculation, based on every component in the network, can be achieved. A more accurate availability calculation helps determine, with more precision, what types of network components are required to actually meet an availability expectation. This can help reduce the cost of implementing a network or help justify expenditures on more reliable components or backup components. Given the mission-critical nature of communications in business today, any increases in network reliability and decreases in cost and network downtime can translate directly to an enterprise's bottom line.

Network availability can be determined while taking into account backup servers and alternate communication traffic routes. Advantageously, the links between the network devices may comprise different failure rates and availabilities, again resulting in a more accurate determination of network availability.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refer to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to determine network availability.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
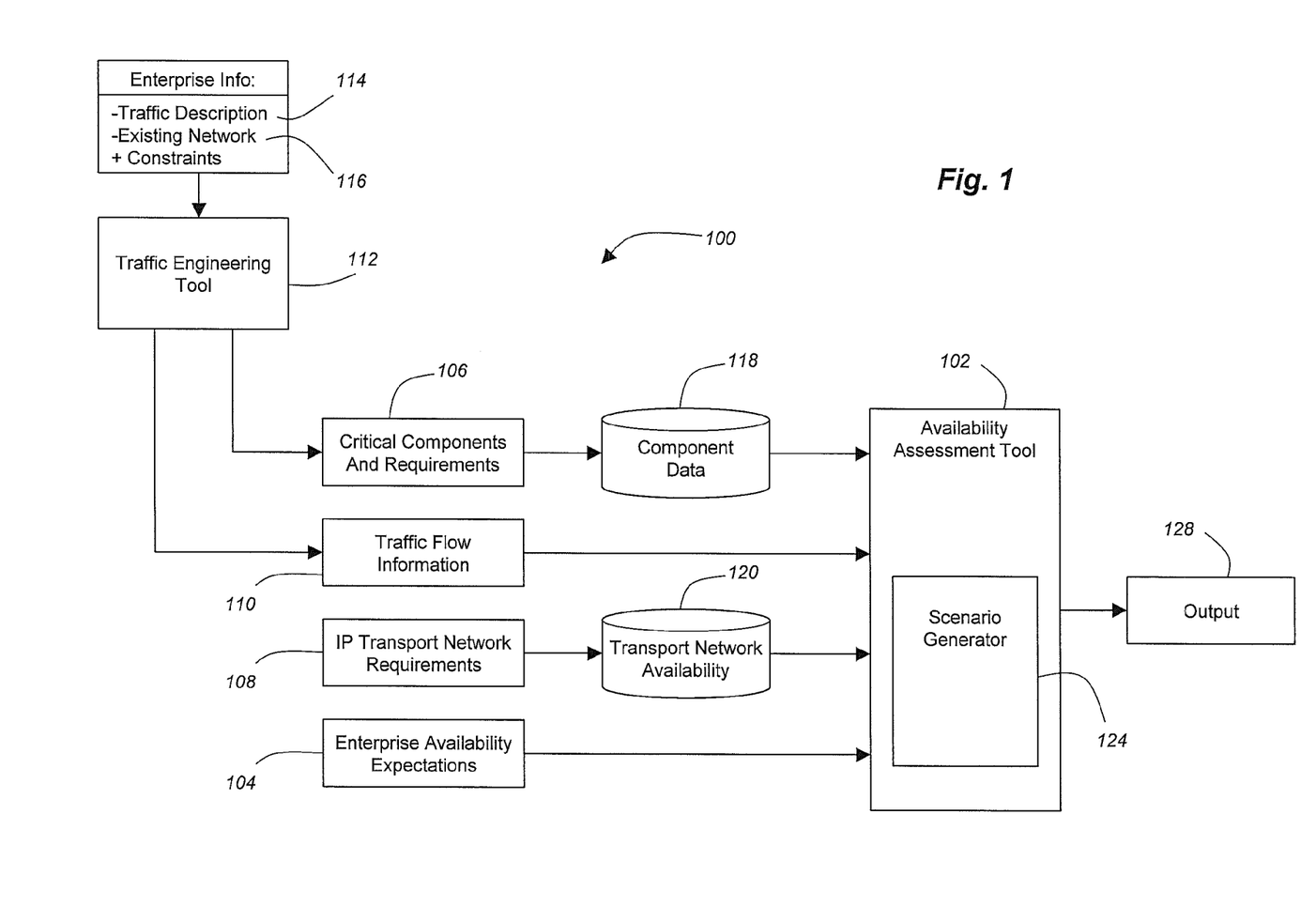
FIG. 1 is a block diagram depicting a system for predicting the availability of a communication network in accordance with embodiments of the present invention.

FIG. 1 shows a block diagram of an embodiment of an availability prediction system 100 comprising an availability assessment tool 102 comprising a scenario generator 124 that utilizes traffic information in a prediction of availability of a telecommunications system or a subsystem thereof by accounting for backup servers and alternate traffic routes.

As shown in FIG. 1, the availability assessment tool 102 receives various inputs such as an (enterprise) availability expectation 104, critical components (i.e., components critical to call processing) and requirements data 106 for the telecommunication system, IP transport network requirements 108, and traffic flow information 110.

The availability expectation 104, for example, may be received from an enterprise, may be imposed by an industry standard, or the like. Typically, an enterprise has an availability expectation for the system in which the system must be available. For example, the enterprise may require an overall availability of 99.9%, 99.99%, 99.999% or the like for the telecommunications system or may require a particular availability for one or more individual site(s) of the system.

The critical components and requirements data 106 for the telecommunication system may be determined based on historical information, may be provided by a component manufacturer or, as shown in FIG. 1, may be determined from a traffic engineering tool 112. One embodiment of such a traffic engineering tool 112, for example, is described in U.S. patent application Ser. No. 10/944,069 entitled "Procedural XML-Based Telephony Traffic Flow Analysis and Configuration Tool" and filed on Sep. 16, 2004, the entire contents of which are hereby incorporated herein by reference. Exemplary critical components and requirements information includes, for each component type (e.g., media server, gateway, port network, IP circuit pack, and the like), the number of components and component requirements necessary to handle the corresponding projected bulk traffic flow.

The traffic engineering tool 112 described in the co-pending application includes a performance modeling and design tool for telecommunications systems, particularly involving IP traffic. The traffic engineering tool 112 determines bulk traffic flows between subsets of components in the telecommunications system. The tool determines bulk traffic flows by identifying communities of interest of components according to defined rules/policies; logically characterizes the network according to a defined model, such as a hierarchical or wire model; based on selected rules such as the Uniform Distribution Model flows bulk traffic through the logical characterization of the network and aggregates traffic at selected points/nodes in the network; and, using the accumulated traffic flows at selected nodes and the desired quality or grade of service and suitable mathematical equations, determines recommended resource requirements (e.g., component requirements). The communities of interest can be grouped by physical and/or network location and/or type of endpoint (e.g., circuit- or packet-switched).

The availability assessment tool 102 also receives IP transport network requirements 108, which reflect the types of traffic loads (e.g., realtime loads such as VoIP traffic, non-realtime loads such as instant messaging, email, and traffic having non-communication data payloads, and the like) on the differing IP data networks (e.g., LAN and WAN network components). These requirements, for example, may be received from the enterprise currently operating an IP data network (e.g., based on historical data or load predictions for the IP data network). Examples of such requirements include network topology, network components and protocols, which provide high performance and fast convergence following a device or link failure, Quality of Service or QoS metrics, such as jitter and packet loss, for voice communications. Other types of traffic have the same and/or other differing transmission requirements.

Finally, the availability assessment tool 102 receives traffic flow information 110. The traffic flow information 110, in the embodiment shown in FIG. 1, is commonly received from the traffic engineering tool 112. The traffic flow information 110 may alternatively or additionally be determined from monitoring actual usage or from historical traffic data or via any other method of collecting traffic flow information known in the art.

In the embodiment shown in FIG. 1, for example, the traffic engineering tool 112 receives traffic description information 114 and existing network and constraints information 116 for the system. The traffic engineering tool 112 determines traffic flow information 110 and critical components and requirements data 106 for the telecommunications system.

In the embodiment of FIG. 1, the critical components and requirements data 106 is mapped to a component-specific availability table or database 118, and the IP transport network requirements data is mapped to a transport network availability table or database 120. The outputs of the mapping operations are provided to the availability assessment tool 102. The information in the availability tables includes availability information, such as Mean Time Between Failures or MTBF, Mean Time to Recover/Repair or MTTR, Mean Time to Failure or MTTF, Failure in Time Rate or FIT, Mean Time between Outages or MTBO, failure rate, reportable outage(s), outage downtime measure(s), downtime measure for partial outage(s), and/or other availability or reliability information for various types of components and/or networks. This information for each component is typically collected over long periods through experience.

The availability assessment tool 102 receives input information and uses the information to predict an availability for an entire enterprise system or for one or more subsystem(s) of the enterprise system for a number of different scenarios. More specifically, the availability assessment tool 102 employs the scenario generator 124 to determine the availability of the entire enterprise system under each scenario generated. Moreover, the availability assessment tool 102 is operable to determine the probability that a particular scenario will occur (e.g., based on the availability of a component(s) that will be failed in a particular scenario as well as the availability of a component(s) that will not be failed in a particular scenario). Within each scenario the availability assessment tool 102 is operable to determine a scenario availability. Once the availabilities for each scenario are determined by the availability assessment tool 102, it can determine an availability probability for each scenario by determining the product of the scenario availability and the scenario probability. The scenario availabilities are then summed together to determine an overall availability of the enterprise system or subsystem(s). This availability data can then be provided as an output 128 for use in determining whether the current network configuration will meet the current availability expectations 104.

Figure 2A:
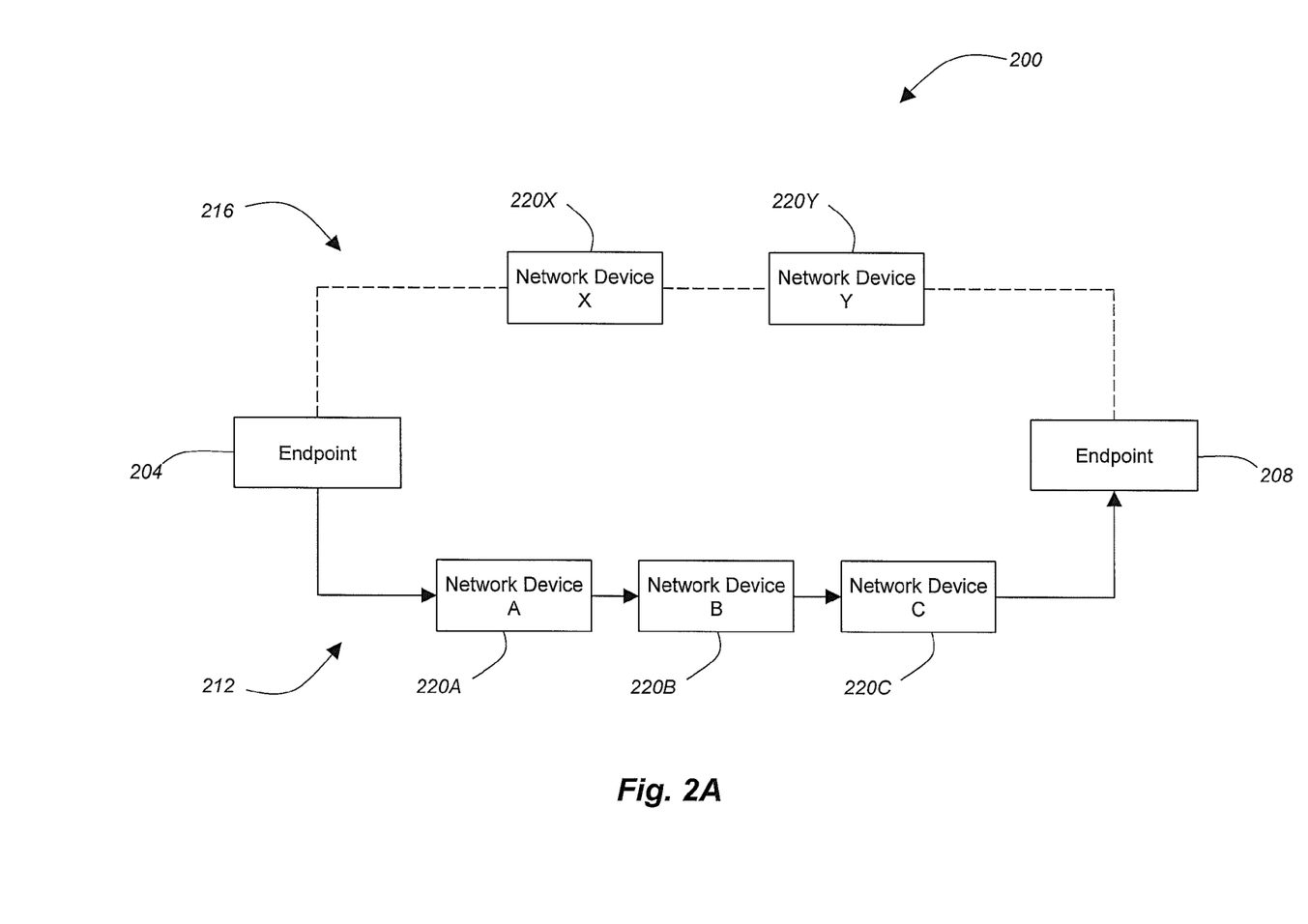
FIG. 2A depicts an exemplary network with two endpoints connected via a first communication path in accordance with embodiments of the present invention.

FIG. 2A depicts an exemplary, albeit simplified, communication system 200 comprising a first endpoint 204 and second endpoint 208 connected to one another through a first traffic route 212. The first traffic route 212, also referred to herein as the primary traffic route, comprises a number of network devices 220A, 220B, 220C that carry signals and media from the first endpoint 204 to the second endpoint 208 and vice versa. The network devices 220 may comprise any type of communications load bearing device such as, for example, Wide Area Networks (WANs), Local Area Networks (LANs), routers, gateways, servers, switches, Voice over Internet Protocol (VoIP) cards, analog-to-digital converters, digital-to-analog converters, modems, circuit boards, circuit elements, data buses, wires, etc. The network devices 220 each comprise an individual availability that defines their projected probability of being active, which in turn implies the corresponding probability of failure. The individual availabilities of each network device 220 contribute to the overall availability of the communication system 200.

In addition to the first traffic route 212, the communication system 200 comprises a second traffic route 216, also referred to herein as the secondary or failover traffic route. The second traffic route 216 may comprise a number of network devices 220X, 220Y similar to the first traffic route 212. In a redundant system, the network devices 220X, 220Y on the second traffic route 216 may serve as backup devices to the network devices residing on the first traffic route 212. For example, the network device 220A may comprise a primary server whereas network device 220X may comprise a backup or secondary server that is used only when network device 220A fails. Alternatively, network devices 220X, 220Y may service other endpoints as a primary route and may serve a secondary function by backing up the first traffic route 212 in case a device fails.

Figure 2B:
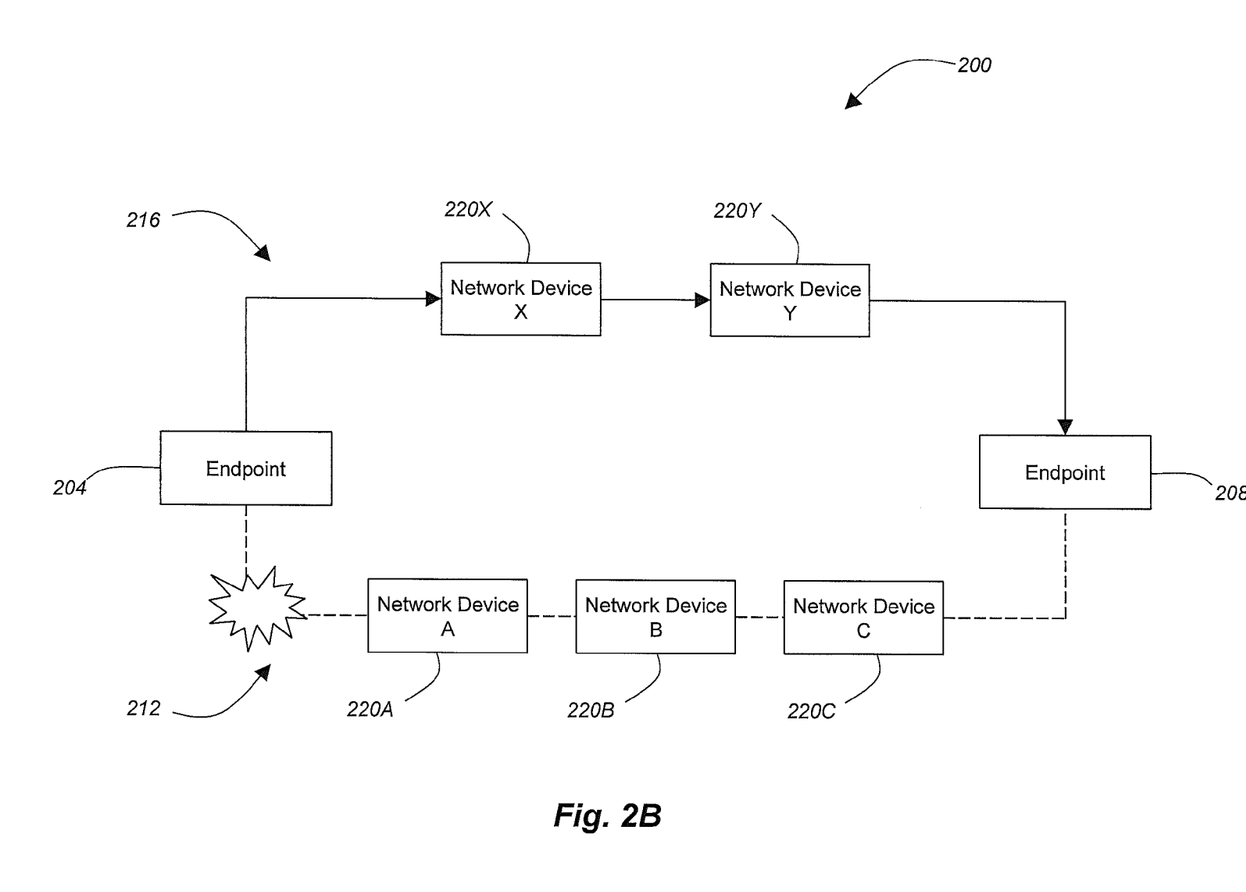
FIG. 2B depicts an exemplary network with two endpoints connected via an alternate traffic route due to a network device failure in accordance with embodiments of the present invention.

As can be seen in FIG. 2B, when the first traffic route 212 fails due to a failure of one or more devices along the first traffic route 212, the endpoints 204, 208 begin communicating with one another via the second traffic route 216. The overall availability for the communication system 200 can be computed by accounting for both scenarios, namely the scenario when communication traffic is flowed from the first endpoint 204 to the second endpoint 208 via the first traffic route 212 (i.e., the "baseline scenario") and the scenario when the communication traffic is flowed from the first endpoint 204 to the second endpoint 208 via the second traffic route 216 (i.e., a first failure scenario). The availabilities of the network under each scenario may depend upon the individual availabilities of each component that is being utilized in a given scenario and the amount of traffic that is flowed over each component in the scenario. Moreover, by using scenarios there is no need to assume that the availability of links between all network devices 220 is exactly the same, as was previously required under the combinatorics method.

For example, the availability of the network 200 in the first scenario will depend upon the individual availabilities of network devices 220A, 220B, and 220C as well as the availabilities of the links connecting the network devices 220A, 220B, and 220C (which may each be different), whereas the availability of the network 200 in the second scenario will depend upon the individual availabilities of network devices 220X and 220Y and the links therebetween. The availabilities of each scenario may then be combined to determine the overall availability of the network 200 accounting for the alternate second traffic route 216.

Figure 3:
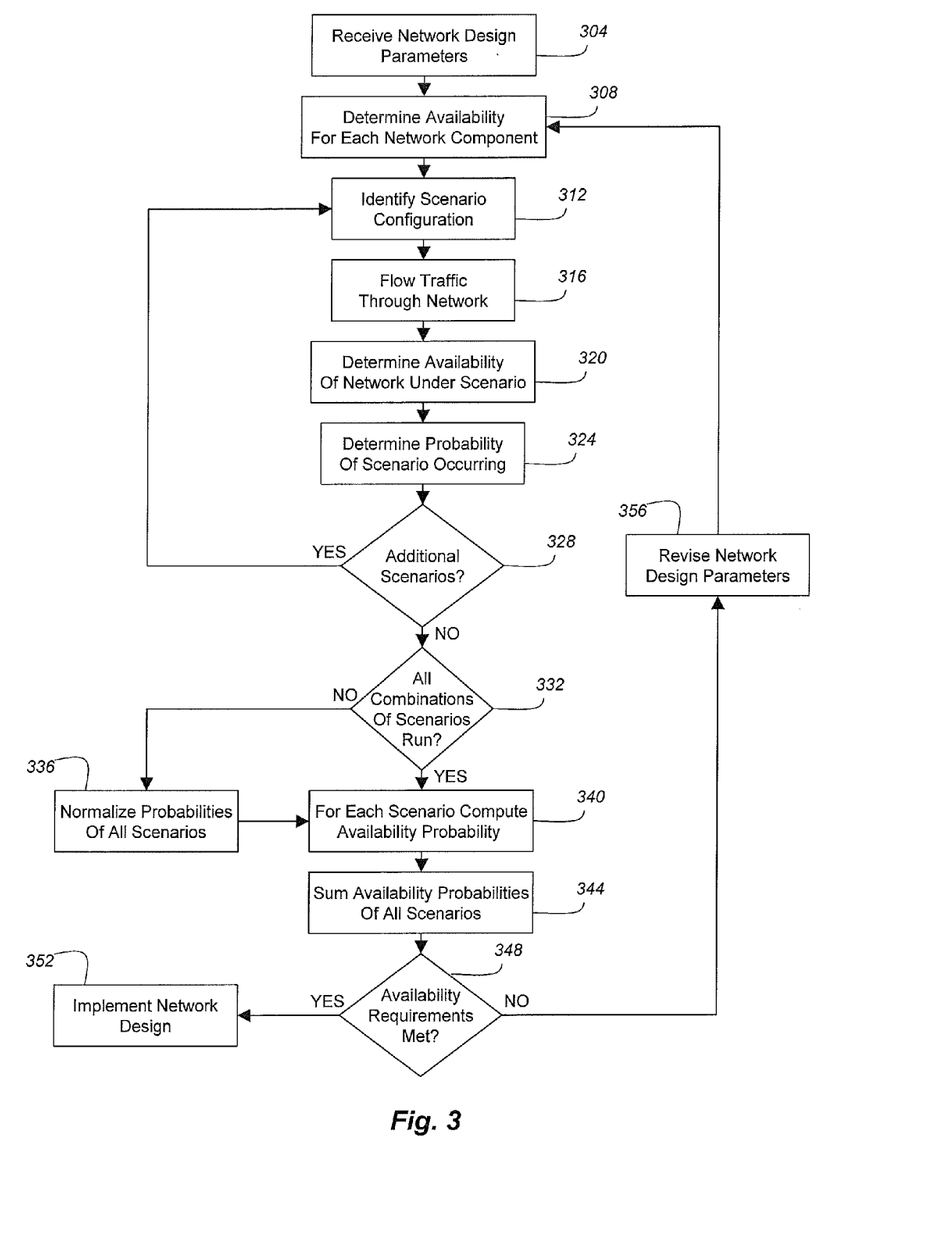
FIG. 3 depicts a flow diagram of a process for predicting an availability of a network by accounting for device failures and alternate traffic routes in accordance with embodiments of the present invention.

Referring now to FIG. 3, operations of the availability assessment tool 102 as well as the scenario generator 124 will be described in further detail in accordance with at least some embodiments of the present invention. The method begins with the availability assessment tool 102 receiving the network design parameters (step 304). The network design parameters may include the inputs received from the traffic engineering tool 112 (i.e., the critical components and requirements data 106 and the traffic flow information 110), the IP transport network requirements 108 and the enterprise availability expectations 104.

Upon receiving the network design parameters, the availability assessment tool 102 continues by determining the availability for each network component (i.e., network device 220 or other network nodes) as well as the individual, and possibly unique, availabilities of the links between the components (step 308). The availabilities of the network components may be retrieved from the component data 118.

Once the availability assessment tool 102 has received both the network design parameters and the availabilities of the components within the network 200, a set of "scenario-generating components" is specified to the availability assessment tool 102 (step 312). That set of components will be used to form the basis of the scenarios to be generated by the scenario generator 124. The number of scenario-generating components, designated by "N", may range from anywhere between a single component to all components within the network 200. However, the full power of the new approach embodied by this patent is best achieved by selecting components that cause fundamental changes in traffic routing when they fail (e.g., WAN-LAN links, main server complexes).

Each of the generated scenarios is characterized by some, all, or none of the scenario-generating components operating properly, and the rest of the scenario-generating components being in a failed state. One example of a scenario is the "baseline scenario", in which all of the scenario-generating components are operating properly. Under the baseline scenario, the communication traffic is flowed from one endpoint to another across the primary traffic path, using the primary servers and other primary components.

The scenario generator 124 will usually implement one of two common strategies for generating the scenarios associated with the N scenario-generating components. The first such strategy is the "N+1" strategy, in which the number of scenarios is equal to N+1. The scenarios generated in this case are the baseline scenario and each of the scenarios in which exactly one of the N scenario-generating components is in a failed state and the rest are operating properly. The second strategy is the "$2^N$" strategy, in which the number of scenarios is equal to $2^N$. The scenarios generated in this case consist of all possible combinations of some, all, or none of the scenario-generating components operating properly and the rest of them failing. Note that the baseline scenario is one of those $2^N$ scenarios (i.e., the scenario in which all of the scenario-generating components are operating properly and none of the scenario-generating components is in a failed state). The scenario generator 124 will generate each of the either N+1 or $2^N$ scenarios (as specified by the end-user), one at a time. For each scenario, the network 200 will be configured so that all components designated for failure in that scenario are disabled during the ensuing traffic flow.

With the network 200 configured according to a particular scenario, the method continues with the availability assessment tool 102 flowing traffic through the network 200 to simulate bulk traffic flows (step 316). The details of this particular step are described in further detail in U.S. patent application Ser. No. 11/087,200 entitled "Traffic Based Availability Analysis", the entire contents of which are hereby incorporated herein by this reference. In this step, bulk traffic flows are determined based on the network configuration and flowed across the appropriate components. Note that when the bulk traffic is flowed, each scenario-generating component contributes a value of zero to the overall downtime; this is because the actual downtimes of scenario-generating components are effectively captured in the scenario probabilities (to be described shortly) rather than in the scenario availabilities.

The bulk traffic flow step simulates signal and media flows across the network 200 between various components, according to the identified communication protocols and component capabilities. Based on the amount of traffic flowed across each component and the individual availabilities of each component, the availability assessment tool 102 is operable to determine the availability of the network 200 under the scenario currently being simulated (step 320). This availability value is then associated with the scenario currently being simulated and is stored as such.

After the availability assessment tool 102 has determined the scenario availability for the scenario currently under simulation, the availability assessment tool 102 continues by determining the probability of occurrence for that particular scenario (step 324). This scenario probability is determined by computing the product of the availability of each of the components that is operating properly in the scenario, and multiplying that product by the product of (1—the availability) of each of the components that is in a failed state in the scenario. So, the scenario probability consists of a product of N terms; each of the scenario-generating components is either operating properly, in which case the corresponding term in the product is the component's availability, or is in a failed state, in which case the corresponding term in the product is (1—the component's availability). One skilled in the art will appreciate that the scenario availability is determined by flowing communication traffic over the individual components in the corresponding configuration, whereas the scenario probability is determined without flowing any communication traffic. Rather, the scenario probability is determined based on the individual availabilities of the scenario-generating components and whether such components are active or failed in the particular scenario.

With the scenario probability and scenario availability determined, the method continues with the availability assessment tool 102 determining if any additional scenarios are to be simulated (step 328). If the number of scenario-generating components (i.e., N) is equal to one, then there can be, at most, only two scenarios run by the availability assessment tool 102, namely, the scenario where the scenario-generating component is active and the scenario where the scenario-generating component has failed. The number of possible scenarios that may be simulated increases either linearly with N (i.e., when using the N+1 strategy) or exponentially with N (i.e., when using the $2^N$ strategy).

If the availability assessment tool 102 determines that at least one more scenario is to be simulated, then the method returns to step 312 where the new scenario configuration is defined (i.e., by identifying the failed and active components in the scenario). After the availability assessment tool 102 has simulated all of the specified scenarios, the method continues with the availability assessment tool 102 determining if it has simulated all possible combinations of scenarios (i.e., the maximum possible number of scenarios, defined by $2^N$) (step 332). If less than all possible combinations of scenarios have been simulated (e.g., if the N+1 strategy is used), then the availability assessment tool 102 normalizes the scenario probabilities by dividing each scenario probability by the total of all scenario probabilities (step 336). That will result in a set of scenario probabilities that sums to 1.

Thereafter, the availability assessment tool 102 continues by computing the availability probability for each scenario (step 340). The availability probability for a given scenario is determined by multiplying the scenario probability, which has been normalized if necessary, by the scenario availability. The availability probability for each scenario can then be summed together to obtain an overall network 200 availability (step 344). This overall network 200 availability is representative of the availability of the network under each scenario considered and accounts for the different availabilities of the network when traffic routes are changed under different scenarios.

Once the availability assessment tool 102 has determined the overall network 200 availability, it continues by comparing it to the enterprise availability expectation 104 to determine if the availability requirements for the network 200 have been met (step 348).

The results of the comparison may be provided as an output 128 to the user, system administrator, or other program interfacing with the availability assessment tool 102. If the overall network 200 availability is less than the enterprise availability expectations 104, then the overall network 200 availability does not meet the requirements and the method continues by revising the network design parameters in an attempt to increase the overall network 200 availability (step 356). Revisions to the network design parameters may include adding more components, such as a backup server or the like, to the network 200 or replacing certain components with other components that have a higher availability. Suggested network configuration revisions may be provided to a user or system administrator via the availability assessment tool 102, which is capable of identifying the component(s) in the network 200 that constrained the availability calculation the most or the components to which the availability calculation was most sensitive. The availability assessment tool 102 may also provide suggestions to address the constraining component such as by replacing the restraining component with a more reliable component or by adding a backup component for the restraining component. The user or system administrator may then identify one or more network design alterations for use in a subsequent network configuration. After the network revisions have been defined, the method returns to step 308.

If, on the other hand, the overall network 200 availability is equal to or greater than the enterprise availability expectations 104, then the overall network 200 availability meets the requirements and the current network 200 configuration is sufficient to provide the desired availability. Accordingly, the availability assessment tool 102 indicates that the current network configuration is acceptable and the network design can be implemented using the same components previously specified (step 352). This indication may be provided to the user or system administrator via a green indicator light or by failing to provide an alert notification. If the overall network 200 availability greatly exceeds the enterprise availability expectation 104, then the availability assessment tool 102 may also provide suggestions to downgrade certain components or remove certain backup components in an attempt to minimize the cost associated with implementing the specified network configuration.

Referring now to FIGS. 4A through 4E, details of the above-described method will be described in connection with an exemplary network 400 configuration. The network 400 may comprise a number of different nodes 404A through 404D corresponding to different enterprise locations. The nodes 404 may further correspond to a LAN established at the enterprise location. The nodes 404 may be connected to one another via a series of WANs 408A through 408D. Each WAN may correspond to a component that may be failed in any given scenario.

In accordance with at least some embodiments of the present invention, the scenario generator 124 may elect to consider the baseline scenario and the four scenarios in which exactly one of the WANs 408A through 408D fails, in order to determine the overall availability of the enterprise network 400 using an N+1 strategy. Each LAN 404, WAN 408, and links therebetween may each have an availability associated therewith that specifies its reliability (e.g., in terms of MTBF, MTTR, MTTF, FIT, MTBO, failure rate, reportable outage(s), outage downtime measure(s), and/or downtime measure for partial outage(s)). For ease of understanding the depicted example, assume that WANs 408A and 408D comprise an availability of 0.99 defining that the WANs 408A and 408D are operational for 99% of their lifetime and WANs 408B and 408C comprise an availability of 0.999 defining that WANs 408B and 408C are operational for 99.9% of their lifetime. The availabilities of each WAN 408 are different in this particular example, although each WAN 408 may comprise the same or essentially the same availability. The availabilities of the WANs 408 have been selected to show the advantages offered by embodiments of the present invention as compared to traditional combinatorics methods that require each WAN 408 to comprise the same availability.

Figure 4A:
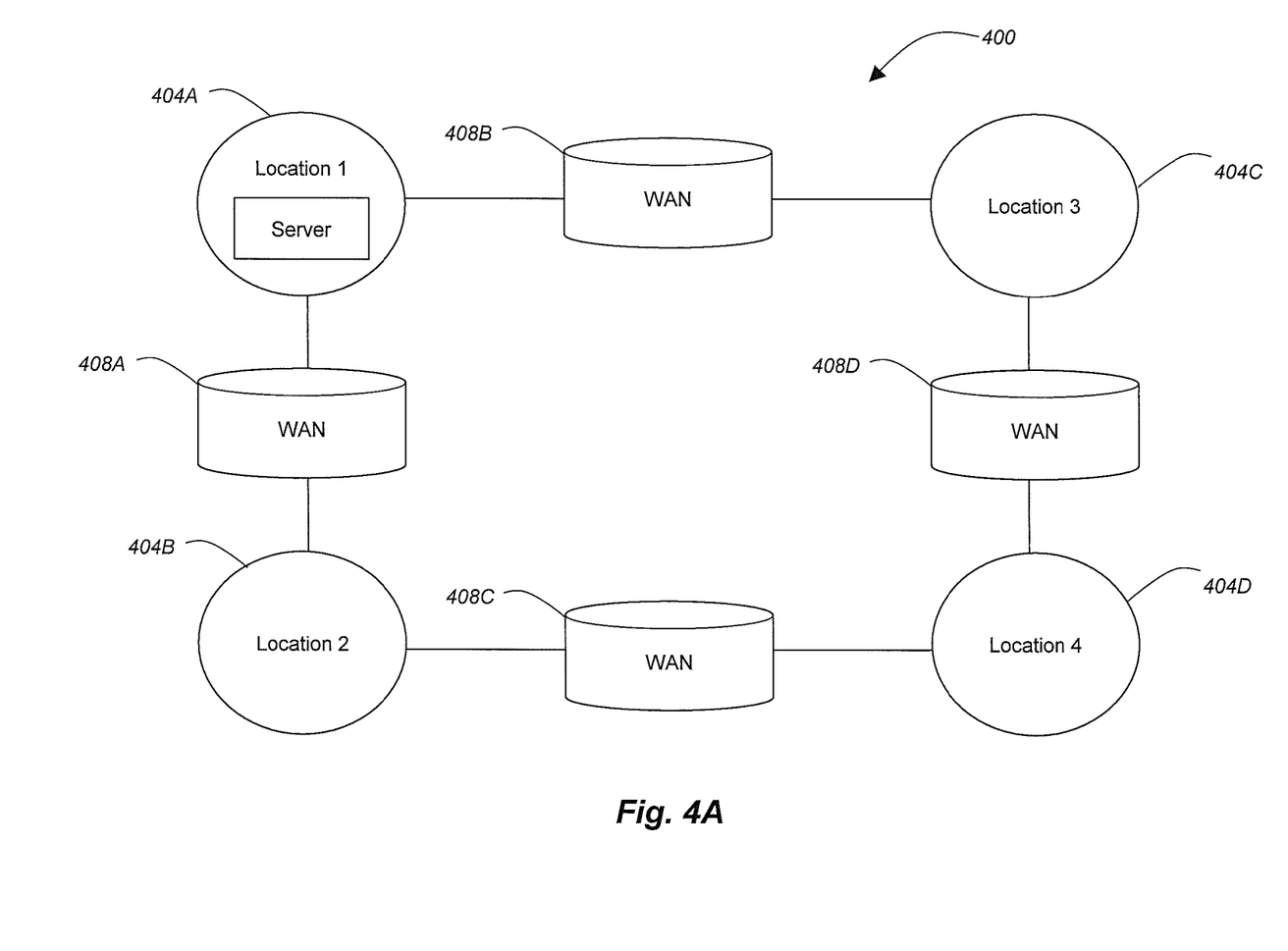
FIG. 4A depicts the configuration of a communication network under a first scenario in accordance with embodiments of the present invention.

Under the baseline scenario depicted in FIG. 4A each WAN 408 is operational and the server at the first node 404A can communicate with all other nodes 404B, 404C, 404D via the most convenient WAN 408. The scenario probability of the baseline scenario is equal to $(0.99)*(0.999)*(0.999)*(0.99)$ or 0.978.

Figure 4B:
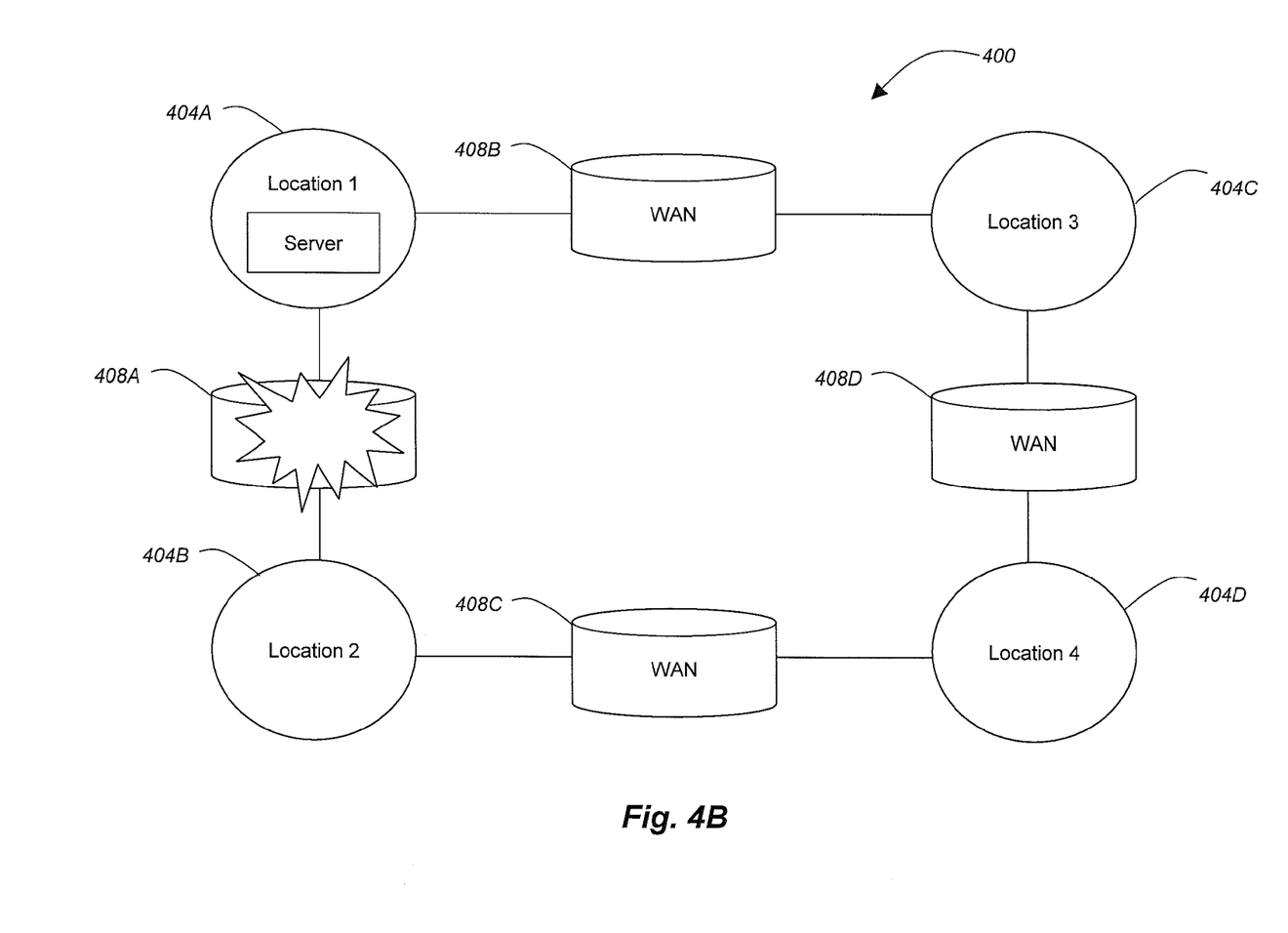
FIG. 4B depicts the configuration of the communication network under a second scenario in accordance with embodiments of the present invention.

Under the first failure scenario depicted in FIG. 4B, the first WAN 408A is shown as failed. The first location 404A is therefore only able to communicate with the second location 404B by transmitting packets through all functioning WANs 408B, 408C, and 408D in the network 400. The scenario probability of the first failure scenario is equal to $(1-0.99)*(0.999)*(0.999)*(0.99)$ or 0.00988.

Figure 4C:
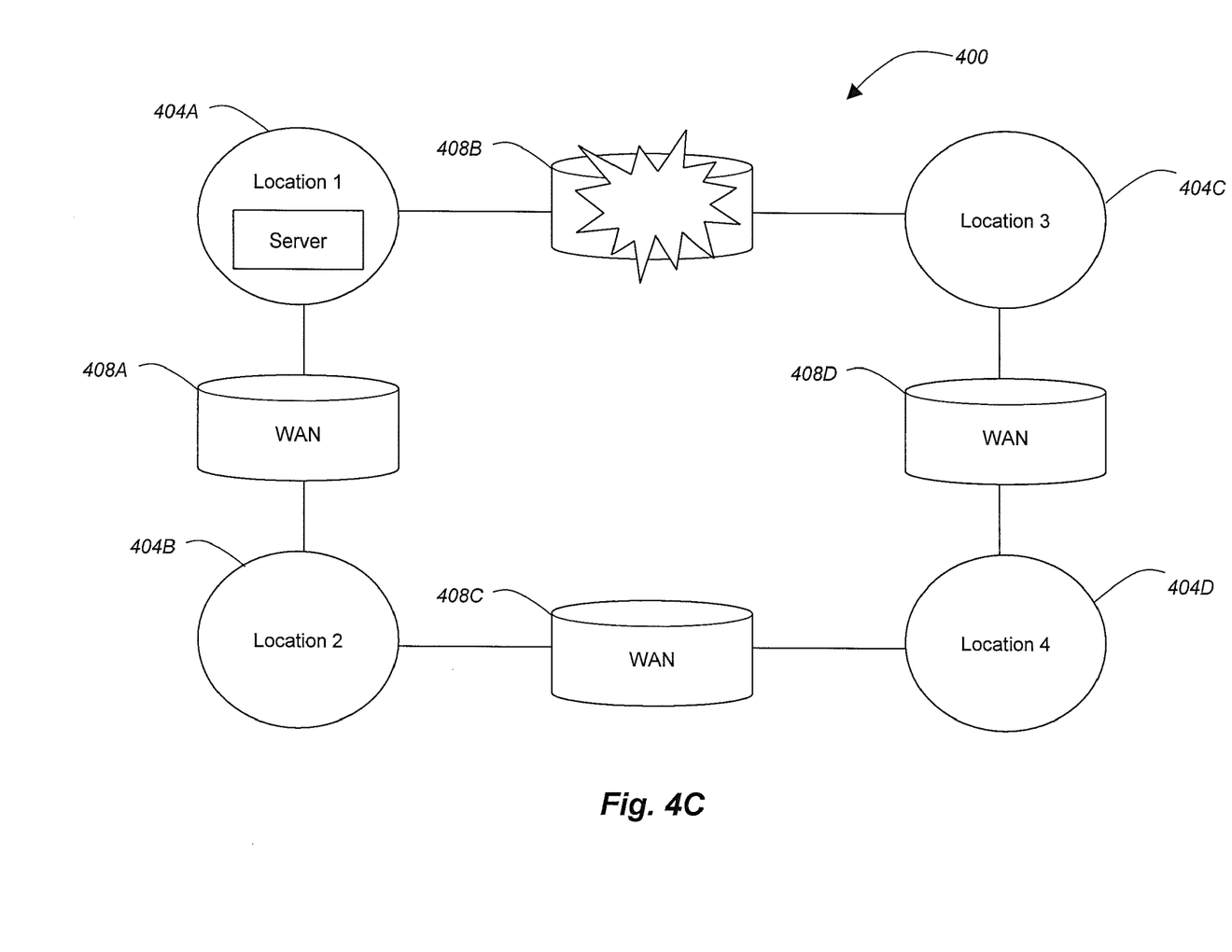
FIG. 4C depicts the configuration of the communication network under a third scenario in accordance with embodiments of the present invention.

Under the second failure scenario depicted in FIG. 4C, the second WAN 408B is shown as failed. The first location 404A is therefore only able to communicate with the third location 404C by transmitting packets through all functioning WANs 408A, 408C, and 408D in the network 400. The scenario probability of the second failure scenario is equal to $(0.99)*(1-0.999)*(0.999)*(0.99)$ or 0.000979.

Figure 4D:
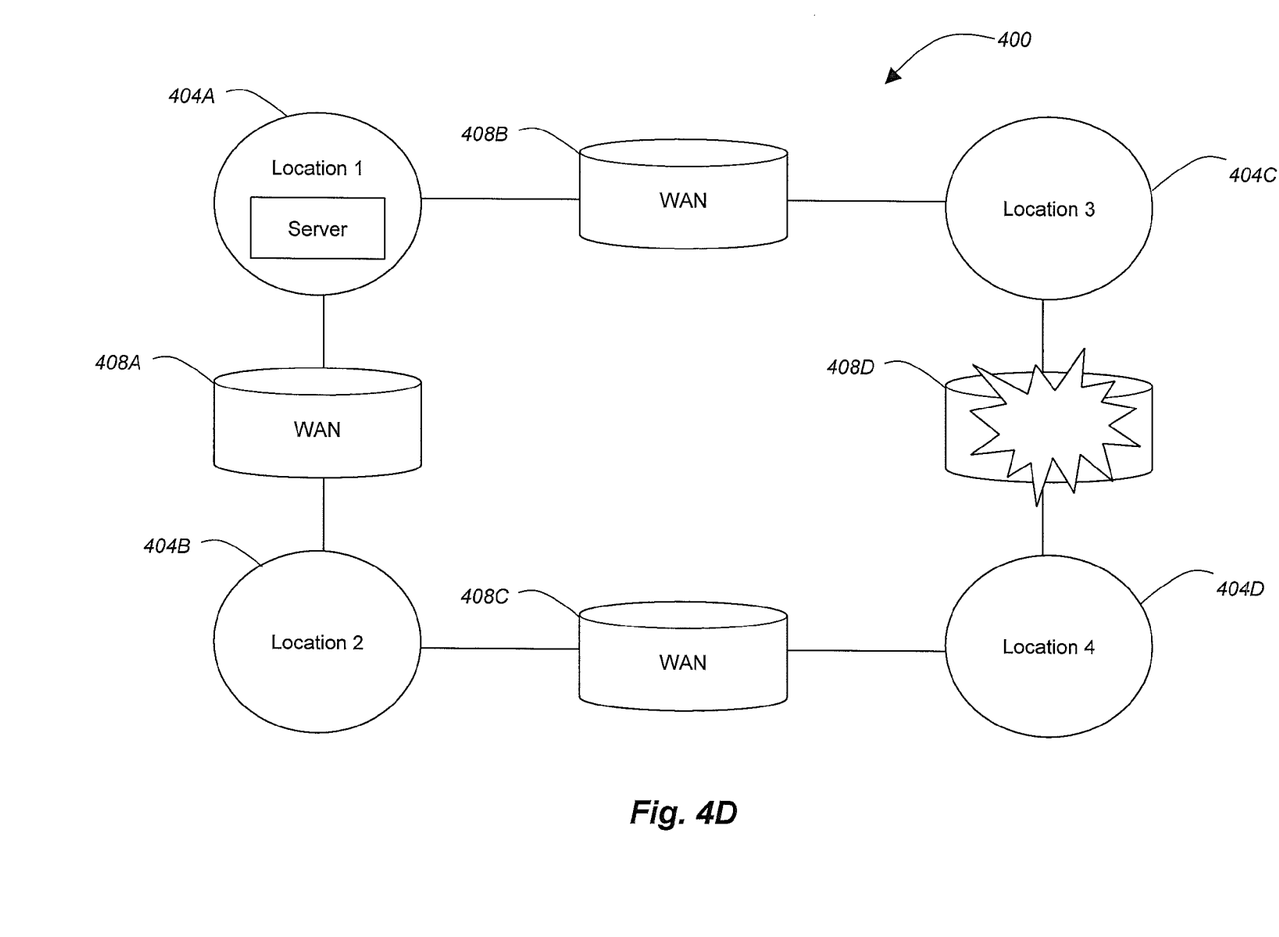
FIG. 4D depicts the configuration of the communication network under a fourth scenario in accordance with embodiments of the present invention.

Under the third failure scenario depicted in FIG. 4D, the fourth WAN 408D is shown as failed. The first location 404A is therefore only able to communicate with the fourth location 404D by transmitting packets through the first and third WANs 408A and 408C respectively. The scenario probability of the third failure scenario is equal to $(0.99)*(0.999)*(0.999)*(1-0.99)$ or 0.00988.

Figure 4E:
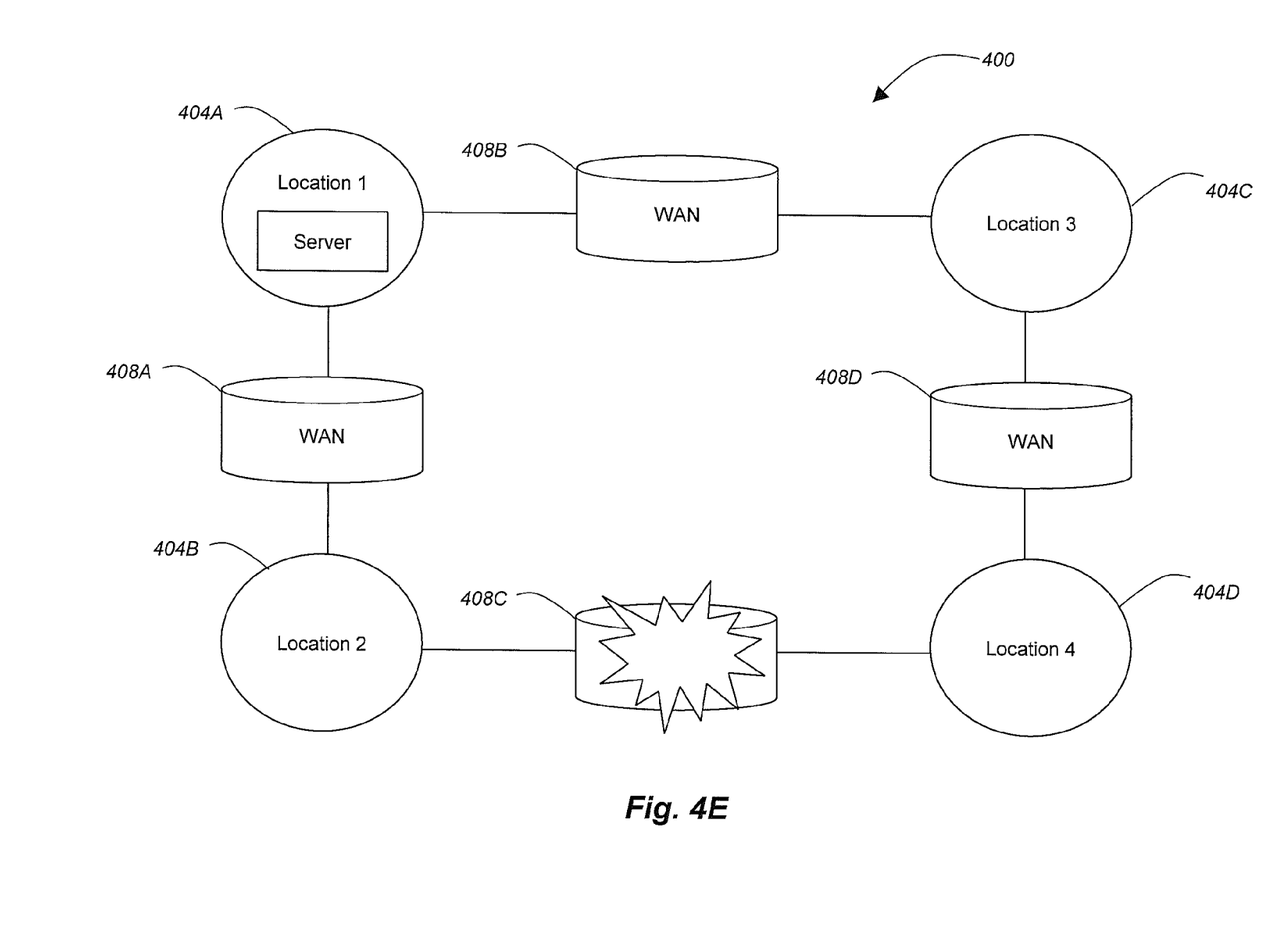
FIG. 4E depicts the configuration of the communication network under a fifth scenario in accordance with embodiments of the present invention.

Under the fourth failure scenario depicted in FIG. 4E, the third WAN 408C is shown as failed. The first location 404A is therefore only able to communicate with the fourth location 404D by transmitting packets through the second and fourth WANs 408B and 408D respectively. The scenario probability of the fourth failure scenario is equal to $(0.99)*(0.999)*(1-0.999)*(0.99)$ or 0.000979.

The sum of the five (un-normalized) scenario probabilities is $0.978+0.00988+0.000979+0.00988+0.000979=0.999718$. Dividing each of those five un-normalized probabilities by 0.999718 yields the following corresponding set of (normalized) scenario probabilities: 0.978275874, 0.009882787, 0.000979276, 0.009882787, and 0.000979276.

For speaking purposes, assume the five corresponding scenario availabilities, obtained by flowing traffic through the network 400 for the various scenario configurations, were 0.996, 0.994, 0.992, 0.995, and 0.993, respectively. Then the overall network availability is calculated as: $(0.978275874)*(0.996)+(0.009882787)*(0.994)+(0.000979276)*(0.992)+(0.009882787)*(0.995)+(0.000979276)*(0.993)=$ 0.995963497, or approximately 99.6 percent.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the computer and network arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for determining the availability of a particular network based on the failure probability for each component in the network. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method for analyzing an availability of at least part of a communications network, the network including a set of network components, the method comprising:
   processor executing an availability assessment tool stored as a set of instructions stored on a tangible, non-transitory computer-readable medium;
   the assessment tool identifying at least a first and second scenario for the network, wherein the first scenario comprises the set of network components arranged in a first communication configuration to support a first path through the network and wherein the second scenario comprises the set of network components arranged in a second communication configuration to support a second path through the network, the second path being an alternate path to the first path;
   the assessment tool determining an availability of the network in the first scenario;
   the assessment tool determining an availability of the network in the second scenario;
   the assessment tool determining a probability with which the first scenario will occur;
   the assessment tool determining a probability with which the second scenario will occur;
   the assessment tool determining an availability probability for the first scenario based on the probability of the first scenario and the availability of the network in the first scenario;
   the assessment tool determining an availability probability for the second scenario based on the probability of the second scenario and the availability of the network in the second scenario;
   the assessment tool summing the availability probability for the first scenario with the availability probability for the second scenario to determine an indication of an overall network availability; and
   the assessment tool providing the indication of the overall network availability.

2. The method of claim 1, further comprising determining one or more scenario-generating components which are active in the first communication configuration and inactive in the second communication configuration.

3. The method of claim 2, further comprising:
   determining an availability associated with each component in the set of network components;
   accounting for the availability associated with each component active in the first scenario when determining an availability of the network in the first scenario;
   accounting for the availability associated with each component active in the second scenario when determining an availability of the network in the second scenario; and
   combining the first scenario availability with the second scenario availability to determine the overall network availability.

4. The method of claim 3, wherein at least one of MTBF, MTTR, MTTF, FIT, MTBO, failure rate, reportable outage(s), outage downtime measure(s), and downtime measure for partial outage are used as an indication of the availability associated with each component in the set of network components.

5. The method of claim 1, wherein less than all possible combinations of components subject to failure are included in a scenario used to determine the overall network availability, the method further comprising:
   normalizing the probability of the first scenario and the probability of the second scenario prior to determining an overall network availability.

6. The method of claim 1, wherein communications traffic is flowed from a first endpoint in the network to a second endpoint in the network via a first traffic route in the first scenario and wherein communications traffic is flowed from the first endpoint in the network to the second endpoint in the network via a second traffic route in the second scenario, and wherein the second traffic route comprises at least one component therein that is not in the first traffic route.

7. The method of claim 1, wherein traffic is flowed across the network in both the first and second scenarios to determine the network availability in the first and second scenarios respectively.

8. The method of claim 1, wherein each component in the set of network components comprise at least one of a Wide Area Network (WAN), Local Area Network (LAN), router, gateway resource, server, switch, digital signal processor, time division multiplexed slot, time division multiplexed bus, trunk, port, transport network, control network, port network, Voice over Internet Protocol (VoIP) card, analog-to-digital converter, digital-to-analog converter, modem, circuit board, circuit element, data bus, and wire.

9. The method of claim 1, wherein at least two components in the set of components comprise different availabilities.

10. A system for analyzing an availability of at least part of a communication network, the network including a set of network components, wherein each component in the set of network components comprises an availability associated therewith, and wherein at least two components in the set of network components comprise different availabilities, the system comprising:
    storage memory including instructions for executing an availability assessment tool, the availability assessment tool operable to:
       identify at least a first and second scenario for the network, wherein the first scenario comprises the set of network components arranged in a first communication configuration to support a first path through the network and wherein the second scenario comprises the set of network components arranged in a second communication configuration to support a second path through the network, the second path being an alternate path to the first path;

determine an availability of the network in the first and second scenario;

determine a probability with which the first scenario will occur;

determine a probability with which the second scenario will occur;

determine an availability probability for the first scenario based on the probability of the first scenario and the availability of the network in the first scenario;

determine an availability probability for the second scenario based on the probability of the second scenario and the availability of the network in the second scenario;

sum the availability probability for the first scenario with the availability probability for the second scenario to determine an indication of an overall network availability;

provide the indication of the overall network availability; and a processor configured to execute the instructions stored on the storage memory.

11. The system of claim 10, wherein the availability assessment tool is further operable to compare the overall network availability to an availability expectation, determine that the overall network availability does not satisfy the availability expectation, and provide, as part of the indication, that the availability expectation is not met by a current configuration of the network components.

12. The system of claim 11, wherein the availability assessment tool is further operable to identify at least one restricting component in the set of components and provide, as part of the indication, a suggestion to replace at least one restricting component with a second component comprising a better availability and provide a backup component to at least one restricting component.

13. The system of claim 10, wherein the availability assessment tool is further operable to determine at least one network component that is subject to failure during operation, and wherein at least one network component is active in the first communication configuration and inactive in the second communication configuration.

14. The system of claim 13, wherein the availability assessment tool is further operable to determine an availability associated with each component in the set of network components, account for the availability associated with each component active in the first scenario when determining an availability of the network in the first scenario, account for the availability associated with each component active in the second scenario when determining an availability of the network in the second scenario, and combine the first scenario availability with the second scenario availability to determine the overall network availability.

15. The system of claim 14, wherein at least one of MTBF, MTTR, MTTF, FIT, MTBO, failure rate, reportable outage(s), outage downtime measure(s), and downtime measure for partial outage are used as an indication of the availability associated with each component in the set of network components.

16. The system of claim 10, wherein less than all possible combinations of components subject to failure are included in a scenario used to determine the overall network availability, and wherein the availability assessment tool is further operable to normalize the probability of the first scenario and the probability of the second scenario prior to determining an overall network availability.

17. The system of claim 16, wherein communications traffic is flowed from a first endpoint in the network to a second endpoint in the network via a first traffic route in the first scenario and wherein communications traffic is flowed from the first endpoint in the network to the second endpoint in the network via a second traffic route in the second scenario, and wherein the second traffic route comprises at least one component therein that is not in the first traffic route.

18. The system of claim 10, wherein traffic is flowed across the network in both the first and second scenarios to determine the network availability in the first and second scenarios respectively.

19. The system of claim 10, wherein each component in the set of network components comprise at least one of a Wide Area Network (WAN), Local Area Network (LAN), router, gateway resource, server, switch, digital signal processor, time division multiplexed slot, time division multiplexed bus, trunk, port, transport network, control network, port network, Voice over Internet Protocol (VoIP) card, analog-to-digital converter, digital-to-analog converter, modem, circuit board, circuit element, data bus, and wire.

20. The system of claim 10, wherein at least two components in the set of components comprise different availabilities.

21. A tangible, non-transitory computer readable medium having stored thereon computer-executable instructions that, when executed by a processor, perform a method for analyzing an availability of at least part of a communications network, the instructions comprising:

instructions to identify at least a first and second scenario for the network, wherein the first scenario comprises the set of network components arranged in a first communication configuration to support a first path through the network and wherein the second scenario comprises the set of network components arranged in a second communication configuration to support a second path through the network, the second path being an alternate path to the first path;

instructions to determine an availability and a probability of the network in the first scenario;

instructions to determine an availability probability for the first scenario based on the probability of the first scenario and the availability of the network in the first scenario;

instructions to determine an availability and a probability of the network in the second scenario;

instructions to determine an availability probability for the second scenario based on the probability of the second scenario and the availability of the network in the second scenario;

instructions to sum the availability probability for the first scenario with the availability probability for the second scenario to provide an indication of an overall network availability; and instructions to provide the indication of the overall network availability.

22. The computer readable medium of claim 21, wherein less than all possible combinations of components subject to failure are included in a scenario used to determine the overall network availability, the instructions further comprising instructions to normalize the probability of the first scenario and the probability of the second scenario prior to determining an overall network availability.

* * * * *